(12) United States Patent
Bremner et al.

(10) Patent No.: US 12,495,697 B2
(45) Date of Patent: Dec. 9, 2025

(54) SYSTEM AND METHOD FOR CONSTRUCTING AN ORGANIC LIGHT EMITTING DIODE (OLED) DISPLAY FOR OUTDOOR USE

(71) Applicant: Bi-Search International, Inc., Irvine, CA (US)

(72) Inventors: Joel Bremner, Irvine, CA (US); Joshua Gomez, Irvine, CA (US); Rodrigo Mier-Hicks, Irvine, CA (US); Peter Park, Irvine, CA (US); Kevin Kim, Irvine, CA (US)

(73) Assignee: Bi-Search International, Inc., Irvine, CA (US)

(*) Notice: Subject to any disclaimer, the term of this patent is extended or adjusted under 35 U.S.C. 154(b) by 561 days.

(21) Appl. No.: 17/881,310

(22) Filed: Aug. 4, 2022

(65) Prior Publication Data

US 2023/0057260 A1 Feb. 23, 2023

Related U.S. Application Data

(60) Provisional application No. 63/230,348, filed on Aug. 6, 2021.

(51) Int. Cl.
| | |
|---|---|
| *G06F 1/16* | (2006.01) |
| *H10K 59/126* | (2023.01) |
| *H10K 59/50* | (2023.01) |
| *H10K 59/80* | (2023.01) |

(52) U.S. Cl.
CPC ............... *H10K 59/50* (2023.02); *G06F 1/16* (2013.01); *H10K 59/126* (2023.02); *H10K 59/871* (2023.02)

(58) Field of Classification Search
CPC ........ G06F 1/16; G06F 1/1601; G06F 1/1603; G06F 1/1605; G06F 1/1607; G06F 1/1609
See application file for complete search history.

(56) References Cited

U.S. PATENT DOCUMENTS

| | | | | |
|---|---|---|---|---|
| 4,816,619 A | * | 3/1989 | Heys, Jr. ................ | H02G 3/083 439/458 |
| 5,397,859 A | * | 3/1995 | Robertson ............ | H02G 15/113 174/92 |

(Continued)

*Primary Examiner* — Adrian S Wilson
(74) *Attorney, Agent, or Firm* — Blue Capital Law Firm, P.C.

(57) ABSTRACT

A comprehensive system and method construction of an organic lighting diode (OLED) display for regular outdoor use. In one embodiment, the system includes an OLED display that includes an OLED panel with a front side and a back side, a front cover glass with an optional controllable UV light blocking medium coupled to the front side of the OLED panel, a rear cover coupled to the OLED panel. The incorporation of a controllable UV light blocking medium—such as electrochromic (EC) glass, Suspended Particle Device Film (SPD), Polymer Dispersed Liquid Crystal (PDLC) or any other equivalent controllable tinting technology bonded to the front side of the OLED panel—allows the display to protect itself from excess light. The UV light blocking medium can be controlled programmatically, by implementing light sensors, timers or by manual control via a switch or similar device.

12 Claims, 10 Drawing Sheets

(56) References Cited

U.S. PATENT DOCUMENTS

| | | | | |
|---|---|---|---|---|
| 5,415,567 A * | 5/1995 | Fusselman | H01R 9/03 | |
| | | | 439/578 | |
| 5,693,908 A * | 12/1997 | Amberger | H02G 3/14 | |
| | | | 361/825 | |
| 5,850,333 A * | 12/1998 | Owanesian | H05K 5/0214 | |
| | | | D13/164 | |
| 5,895,292 A * | 4/1999 | Affeltranger | H01R 13/6599 | |
| | | | 439/931 | |
| 5,925,851 A * | 7/1999 | Sugahara | H01R 13/5208 | |
| | | | 174/152 G | |
| 6,162,989 A | 12/2000 | Garner | H05K 9/0018 | |
| | | | 174/358 | |
| 6,919,678 B2 | 7/2005 | Ozolins | G06F 1/1607 | |
| | | | 220/2.1 R | |
| 8,081,267 B2 * | 12/2011 | Moscovitch | G06F 1/206 | |
| | | | 349/59 | |
| 8,102,483 B2 * | 1/2012 | Perry | H05K 5/00 | |
| | | | 349/59 | |
| 8,247,706 B2 * | 8/2012 | Liao | H05K 9/0018 | |
| | | | 174/360 | |
| 8,717,751 B2 * | 5/2014 | Marker | H04N 5/64 | |
| | | | 361/679.48 | |
| 9,235,232 B2 * | 1/2016 | King | H05K 5/03 | |
| 10,015,896 B2 * | 7/2018 | Gaddam | H05K 7/20972 | |
| 10,716,224 B2 * | 7/2020 | Dunn | H05K 5/0017 | |
| 2008/0297998 A1 * | 12/2008 | Choi | H04N 5/64 | |
| | | | 361/679.02 | |
| 2009/0231807 A1 * | 9/2009 | Bouissiere | H05K 7/20972 | |
| | | | 361/689 | |
| 2009/0231808 A1 * | 9/2009 | Burgner | H05K 7/20972 | |
| | | | 361/679.01 | |
| 2010/0066916 A1 * | 3/2010 | Takata | H01J 5/48 | |
| | | | 362/217.01 | |
| 2010/0171889 A1 * | 7/2010 | Pantel | G02F 1/133308 | |
| | | | 349/1 | |
| 2011/0216482 A1 * | 9/2011 | Moscovitch | G06F 1/1656 | |
| | | | 361/679.01 | |
| 2012/0039042 A1 * | 2/2012 | Moscovitch | H05K 7/2099 | |
| | | | 361/701 | |
| 2012/0092818 A1 * | 4/2012 | Perry | H04N 5/64 | |
| | | | 361/679.01 | |
| 2012/0120625 A1 * | 5/2012 | Moscovitch | G06F 1/206 | |
| | | | 361/807 | |
| 2018/0314103 A1 * | 11/2018 | Dunn | G09F 9/35 | |
| 2020/0150602 A1 * | 5/2020 | Trikha | E06B 9/24 | |

\* cited by examiner

SYSTEM AND METHOD FOR CONSTRUCTING AN ORGANIC LIGHT EMITTING DIODE (OLED) DISPLAY FOR OUTDOOR USE

CROSS-REFERENCE TO RELATED APPLICATIONS

The present Application claims the benefit of U.S. Provisional Patent Application Ser. No. 63/230,348 filed on Aug. 6, 2021, the entire disclosure of which is incorporated herein in its entirety by reference.

FIELD

This disclosure generally relates to OLEDs, and more particularly, to a system and method for constructing an OLED display for outdoor use.

BACKGROUND

OLED is a display technology that uses organic molecules to produce their electrons. OLED technology is an improvement on traditional LED displays as it does not require a backlight unit to function, but rather light is emitted separately for each individual sub pixel and then passes through a passive color filter, like with LCD, and out through the display. Because OLED panels do not require a back light, and are significantly thinner and lighter than previous technologies, they can be incorporated into many useful applications.

Several methods exist to produce OLED display assemblies, however, for the most part they are geared toward indoor use, they do not allow for typical outdoor use which involves exposure to dust, moisture, or sunlight. Long term use of a standard OLED display outdoors will lead to damage to the OLED panel due to UV light exposure, thermal loading which could also affect the electronic components, or both. Therefore, it is beneficial to have a system and method to construct OLED displays designed for outdoor use while supporting removability, efficiency, serviceability, and aesthetics.

Furthermore, it would be advantageous to have a system and method of constructing the OLED assembly in a manner that it provides ingress protection while still allowing for disassembly for repair or maintenance. The key for this would be to have a reliable non-permanent seal around the components so that the OLED assembly can still undergo regular maintenance. In addition, it would be advantageous to have a system and method to construct the display assembly with a UV light protection system that can be activated when the screen is not in use and deactivated when the screen will be used. It is important that this UV protection feature can be implemented for any type of display, including OLED, TFT-LCD, LED, Micro LED, etc.

SUMMARY

A comprehensive system and method construction of an organic lighting diode (OLED) display for regular outdoor use. In one embodiment, the system includes an OLED display that includes an OLED panel with a front side and a back side, a front cover glass with an optional controllable UV light blocking medium such as electrochromic (EC) glass, Suspended Particle Device Film (SPD), Polymer Dispersed Liquid Crystal (PDLC) or any other equivalent controllable tinting technology coupled to the front side of the OLED panel, a metal or plastic rear cover coupled to the OLED panel. The incorporation of a controllable UV light blocking medium on the front side of the OLED panel (also applicable for TFT-LCD, LED, Micro LED displays) allows the display to protect itself from the constant UV light exposure to which the display will be subjected when used in its intended outdoor use. The controllable UV light blocking medium can be controlled programmatically, by implementing light sensors, timers or by manual control via a switch or similar device.

The system further includes an ingress protection sealing system that allows for multiple individually sealed compartments within the OLED display's outer cover to protect the electronics within from dust and moisture and light splashing of water.

DETAILED DESCRIPTION

Figure 1:
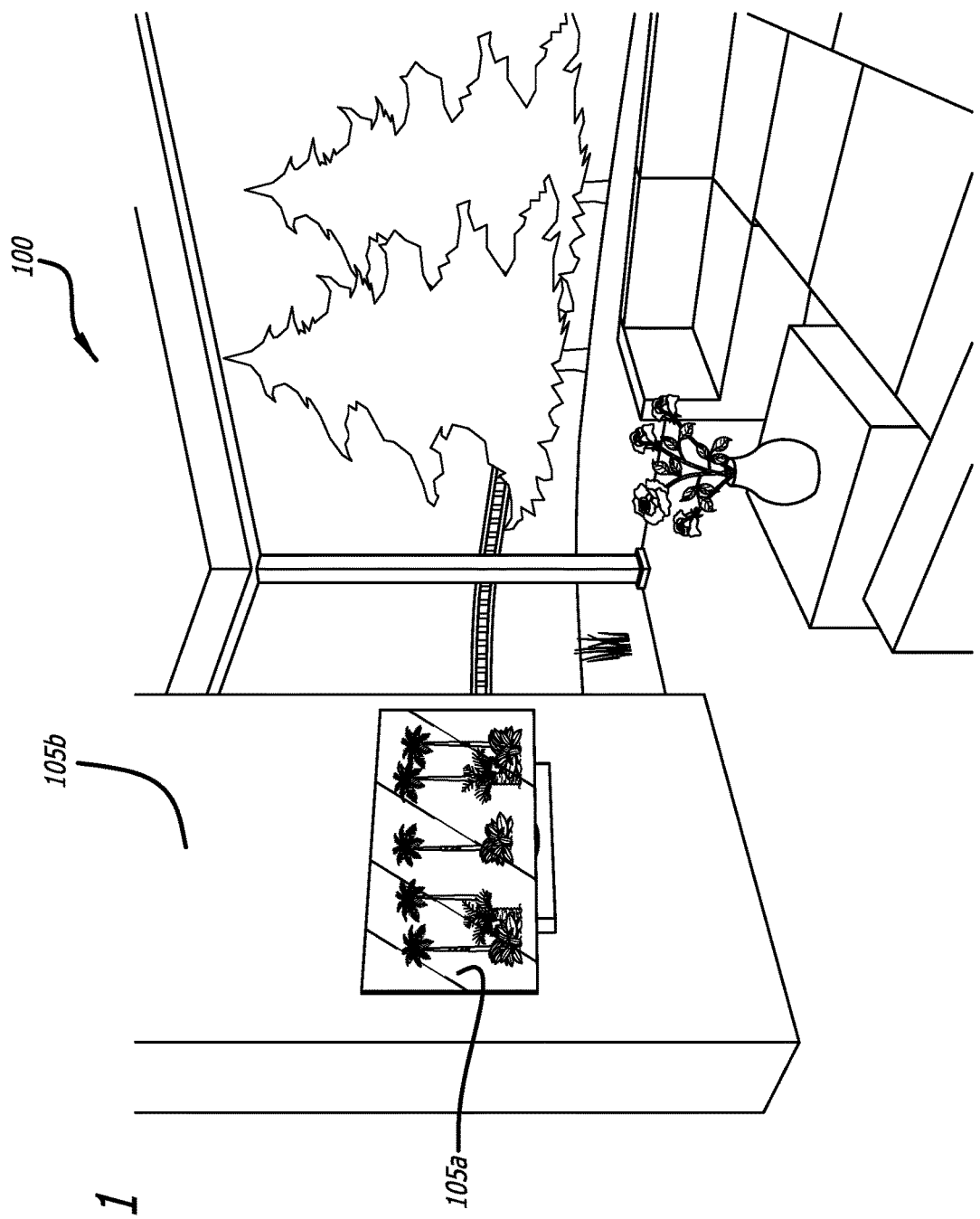
FIG. 1 shows an exemplary installation of an outdoor OLED display in landscape mode on an architectural column or wall according to one exemplary embodiment.
Figure 2:
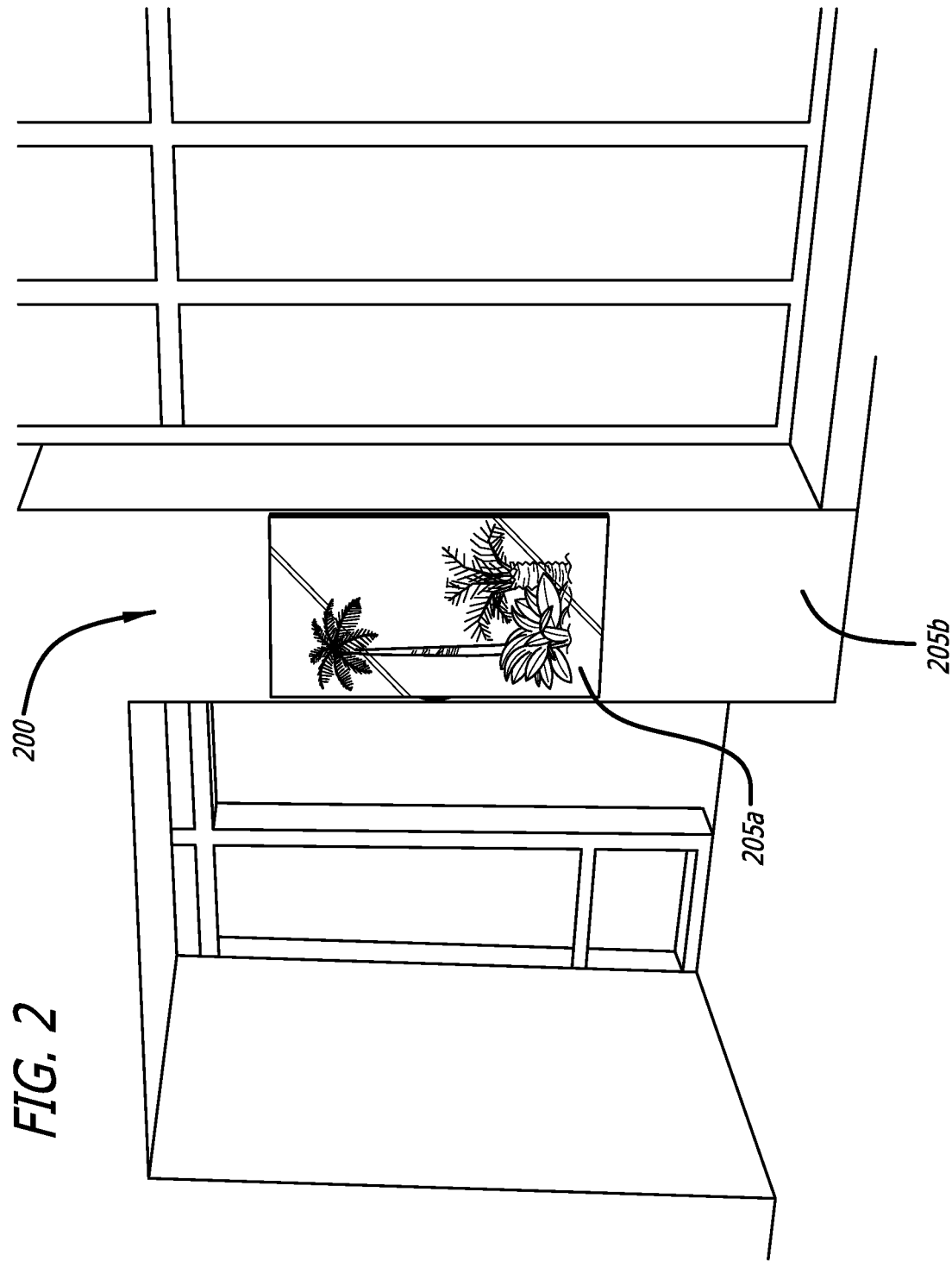
FIG. 2 illustrates an exemplary installation of an OLED display in portrait mode on an architectural column or wall according to one exemplary embodiment.

FIG. 1 shows an exemplary installation 100 of an outdoor OLED display 105a in landscape mode on an architectural column or wall 105b according to one exemplary embodiment. FIG. 2 illustrates an exemplary installation 200 of an outdoor OLED display 205a in portrait mode on an architectural column or wall 205b according to one exemplary embodiment.

Figure 3:
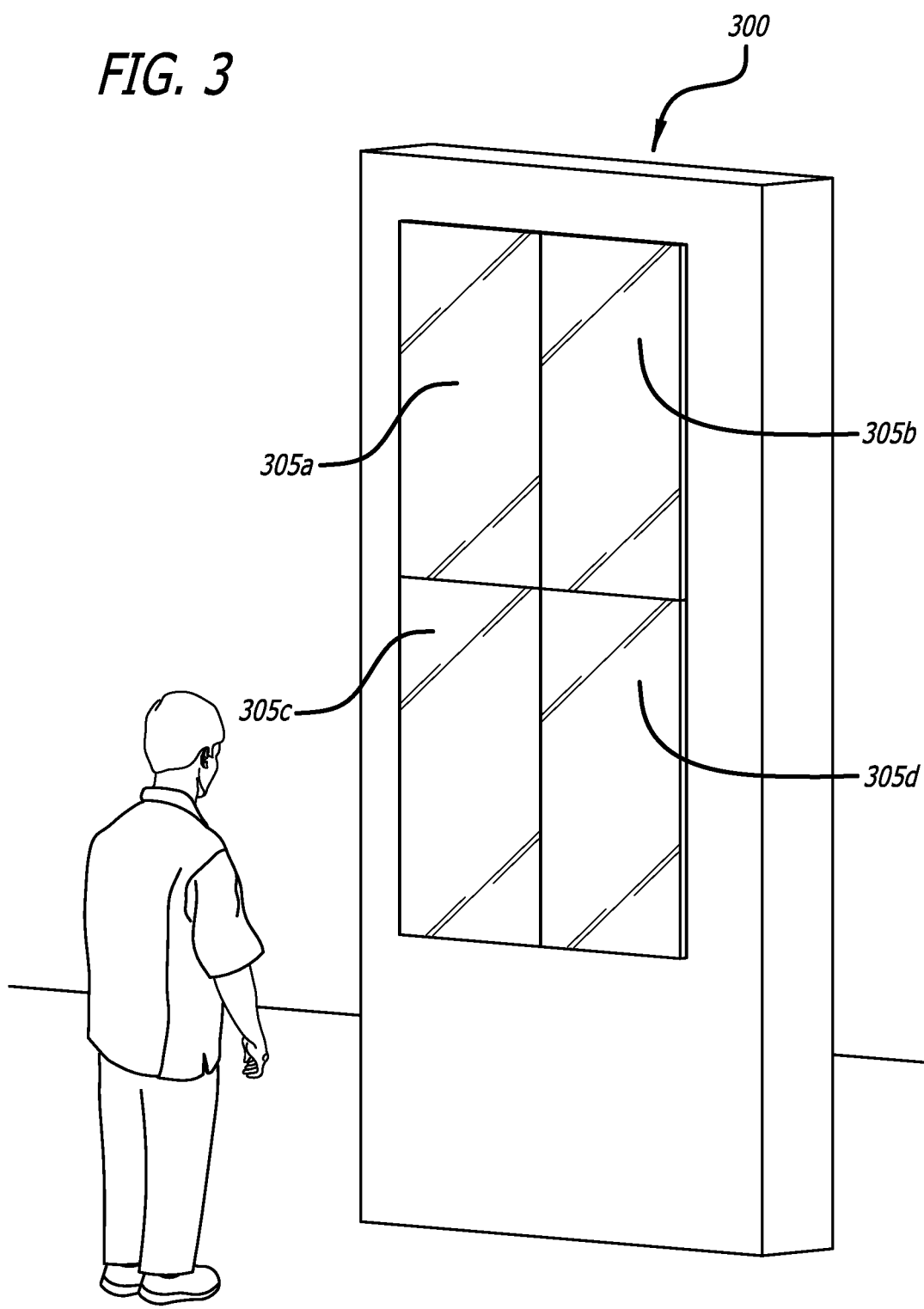
FIG. 3 shows an exemplary installation system with multiple OLED displays in portrait mode on an architectural column or wall according to one exemplary embodiment.

FIG. 3 shows an exemplary installation system 300 with multiple OLED displays 305a, 305b, 305c and 305d in portrait mode on an architectural column or wall according to one exemplary embodiment. As illustrated in FIG. 3, the installation system 300 allows for narrow borders between the OLED displays 305a, 305b, 305c and 305d that would provide a better overall image. In one embodiment, multiple OLEDs (in either landscape or portrait) can be combined into a video wall.

Figure 4:
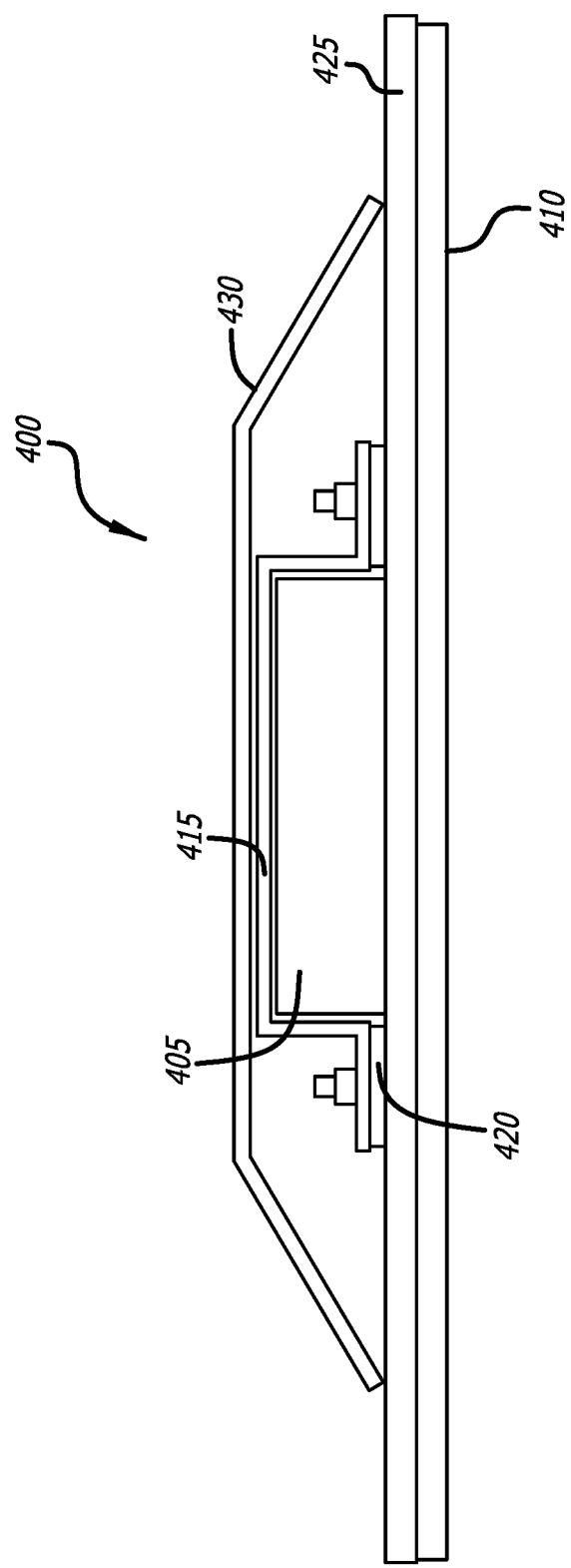
FIG. 4 illustrates a cross section view of the double layer casing to protect the electronics (which power and control the OLED panel) from dust and moisture according to one exemplary embodiment.

FIG. 4 illustrates a cross section view 400 of the double layer encasing to protect the electronics 405 which power and control the OLED display 410 according to one exemplary embodiment. The electronics box 415 encases the electronics 405, sealing out moisture and dust with gasket 420 between itself and the back cover 425. The back cover 425 also works to protect the rear face of the OLED display from dust and moisture. Outer cover 430 acts as the second layer that protects the electronics box from direct solar loading, dust and mild splashing, while allowing for enhanced aesthetics. The outer cover is not sealed from dust. On the contrary, ventilation holes are added to the outer cover to allow air flow through it. The airflow allows for hot air trapped between the outer cover and the electronics box to be replaced by lower temperature air from the environment.

Figure 5:
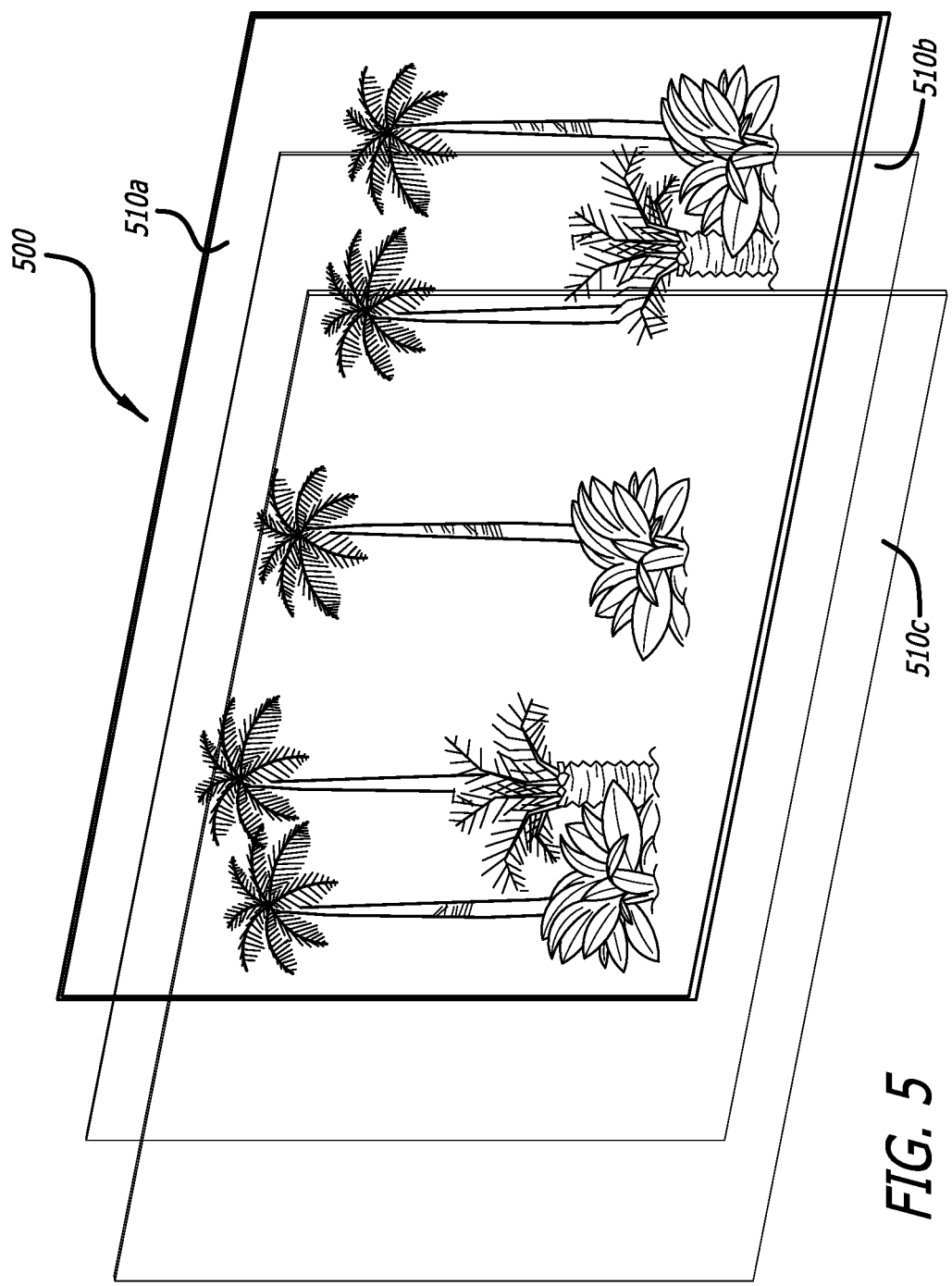
FIG. 5 shows an exploded view of an OLED display optically bonded to cover glass to protect front face from dust, moisture and potentially, UV light, via the implementation of a controllable UV blocking medium according to one exemplary embodiment.

FIG. 5 shows an exploded view of an OLED display optically bonded to cover glass 500 according to one exemplary embodiment. The OLED display bonded assembly 500 includes an OLED display 510a, an optical bond layer 510b, and the cover glass 510c. The bond layer 510b and cover glass 510c provide rigidity for OLED display 510a while also protecting OLED display 510a from dust and water.

Figure 6A:
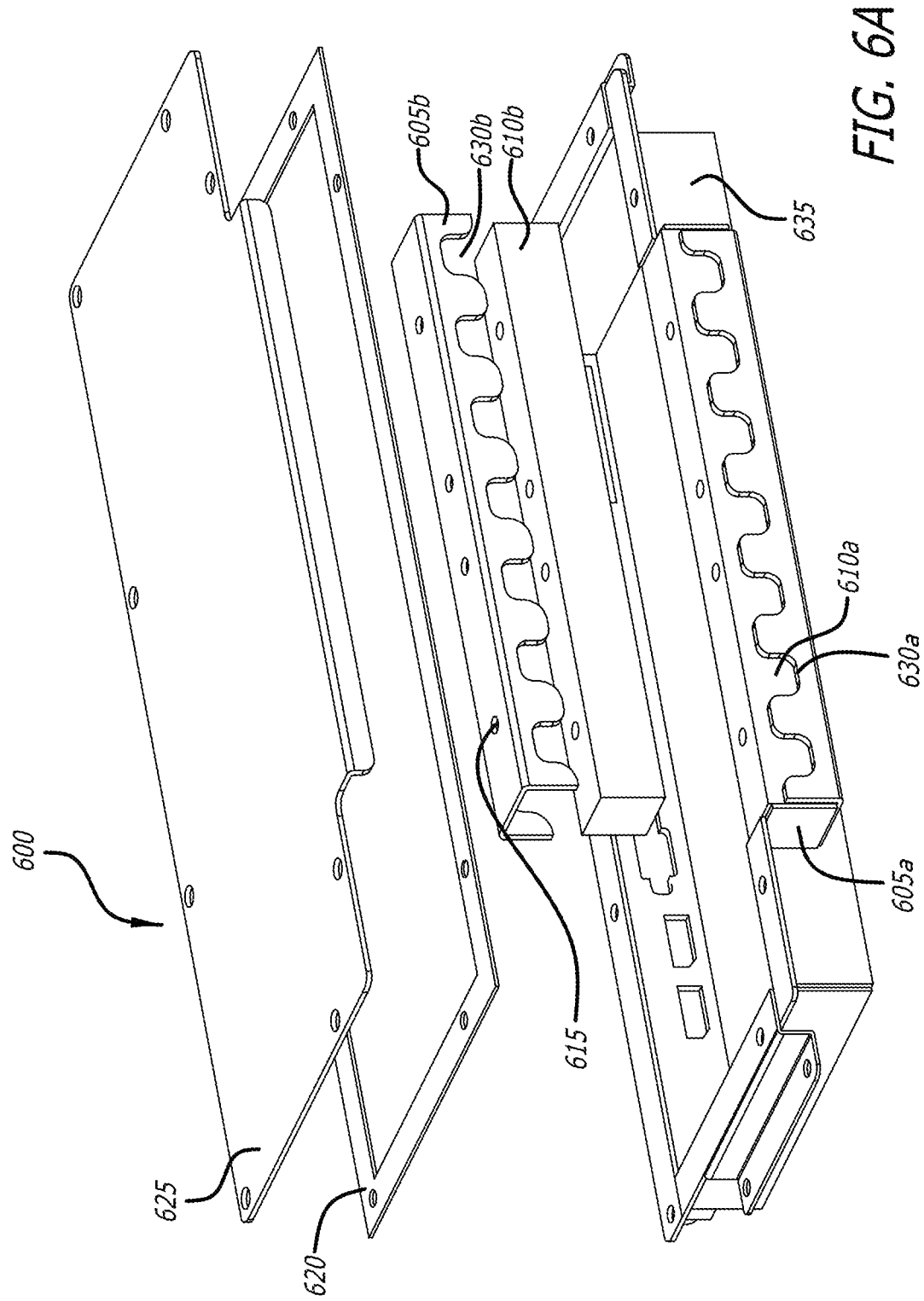
FIGS. 6A-6B show different views of a gasketing system assembly to prevent moisture and dust from damaging cable inputs according to one exemplary embodiment.

FIG. 6A shows an exploded view of a cable cavity or box (shown as element 810 in FIG. 8) with gasketing system assembly 600 according to one exemplary embodiment. As shown in FIG. 6A, the gasketing system assembly 600 includes a bottom housing portion 605a for a lower thick and compressible foam gasket strip 610a and a top housing portion 605b for an upper thick and compressible foam gasket strip 610b. The bottom housing portion 605a and the top housing portion 605b have cut-out portions 630a and 630b to rout cables (shown as element 640 in FIG. 6B). The top housing portion 605b and the bottom housing portion 605a are secured together via screw holes 615. Assembly 600 also includes a cavity lid 625 and a thin foam gasket 620 between the cavity lid 625 and the cavity bottom 635 to prevent moisture and dust from damaging cable inputs.

Figure 6B:
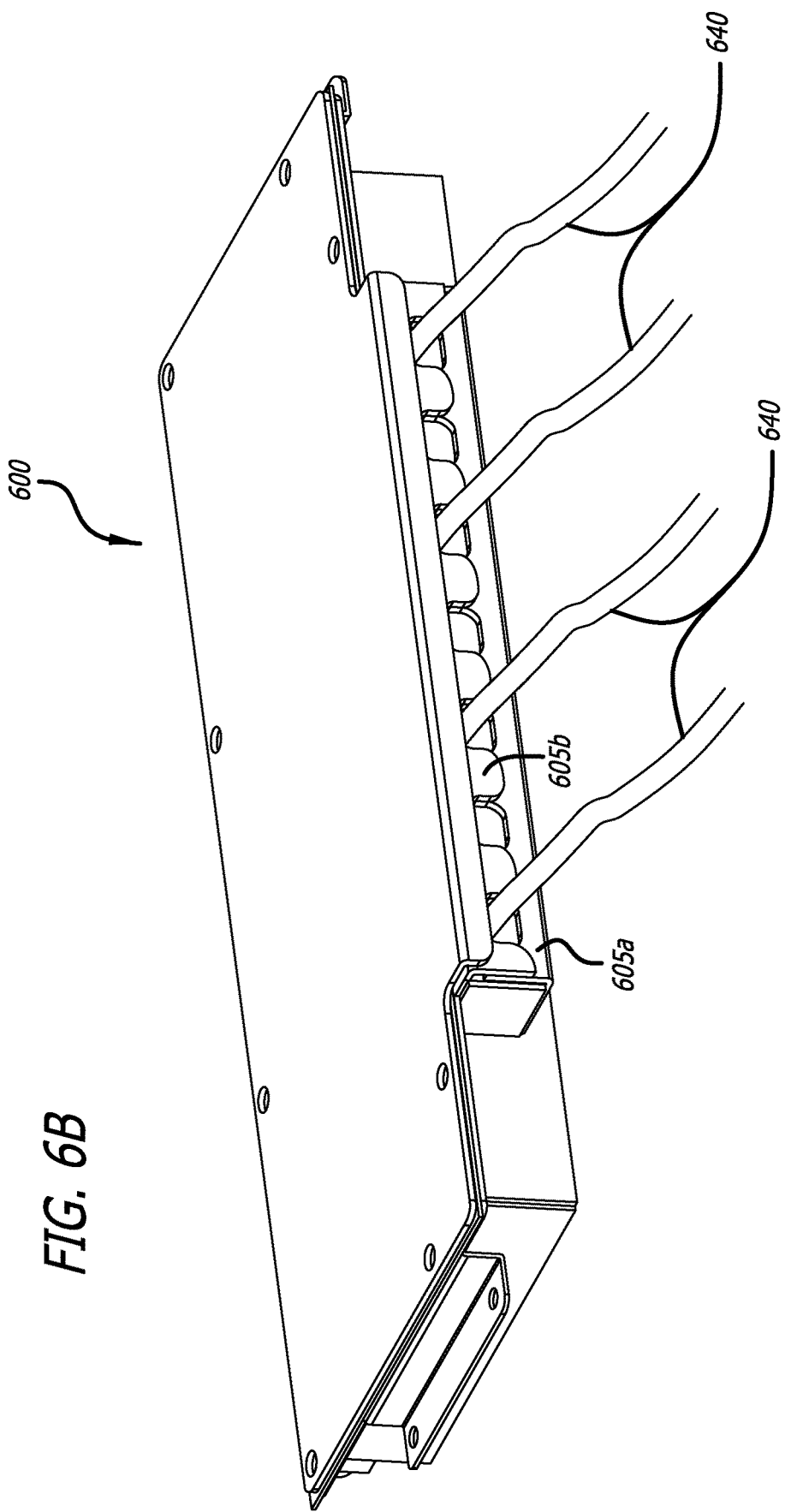

FIG. 6B shows a collapsed view of a cable cavity with gasketing system assembly 600 according to one exemplary embodiment. As shown in FIG. 6B, gasketing system assembly 600 includes a top housing portion 605b with a thick foam gasket (shown as element 610b in FIG. 6A), and a bottom housing portion 605a with a thick foam gasket (shown as element 610a in FIG. 6A). When the top housing portion 605a is secured or attached to the bottom housing portion 605a, the foam gaskets (shown as elements 610a and 610b in FIG. 6A) clamp around cables 640 to prevent moisture and dust from damaging cable inputs. The cables 640 are routed through cut-out portions (shown as elements 630a and 630b in FIG. 6A) of the bottom housing portion 605a and the top housing portion 605b.

Figure 7A:
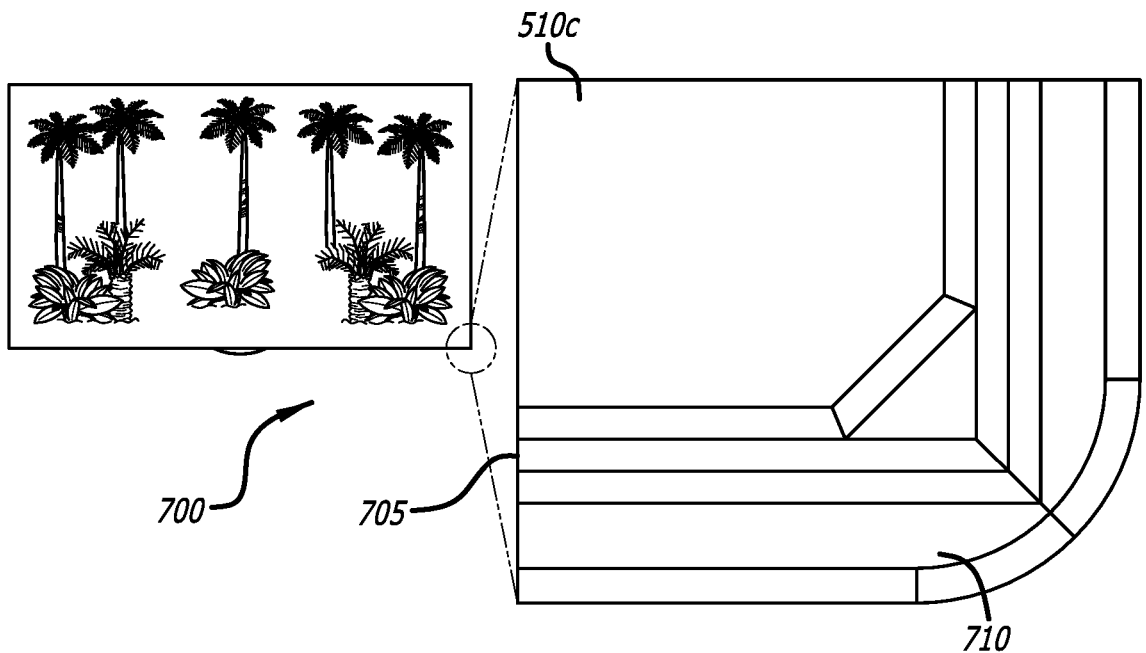
FIGS. 7A-7B illustrate an OLED display assembly with a sealant such as room temperature vulcanizing (RTV) silicon or Butyl rubber applied to the front and back seams to protect the OLED from dust and moisture according to one exemplary embodiment.
Figure 7B:
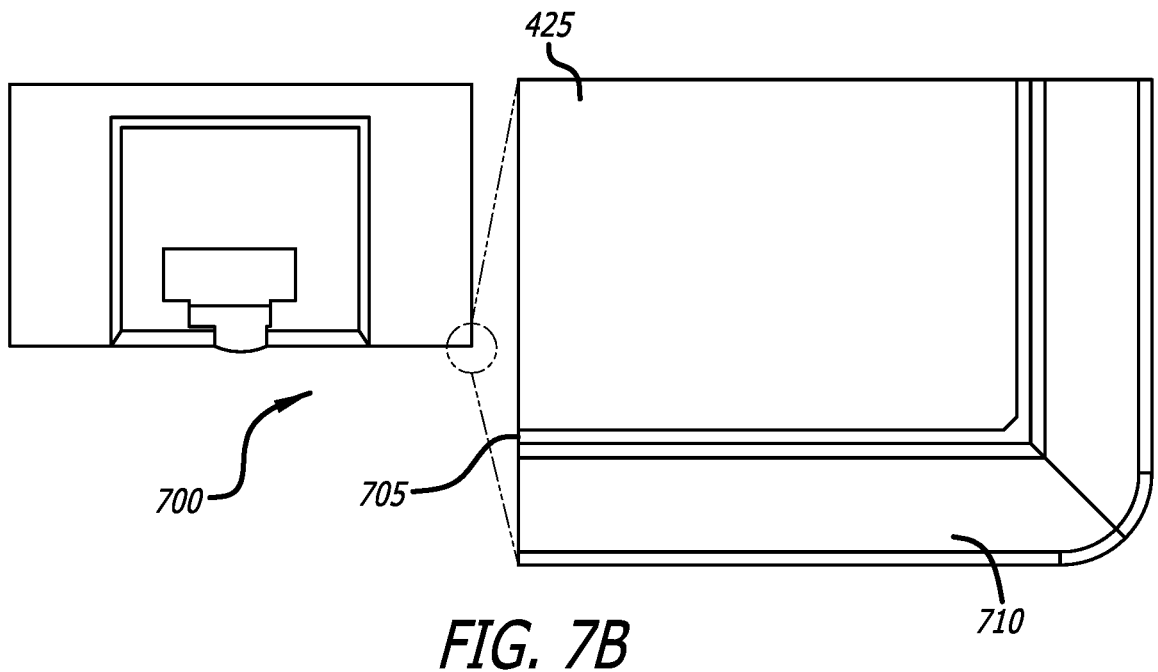

FIG. 7A shows a detail view of a room-temperature-vulcanized (RTV) sealant applied to front face seams of an OLED display assembly according to one exemplary embodiment. As shown, RTV seal 705 is applied in between cover glass 510c and bezel 710 to create a seal that protects OLED display from dust, water ingress and moisture. FIG. 7B shows a detail view of the same RTV system 700 applied to the rear face edge seams of the OLED display assembly according to one exemplary embodiment. In one embodiment, RTV sealant 705 is applied between back cover 425 and bezel 710 to create a seal that protects the OLED display from dust, water ingress, and moisture.

Figure 8:
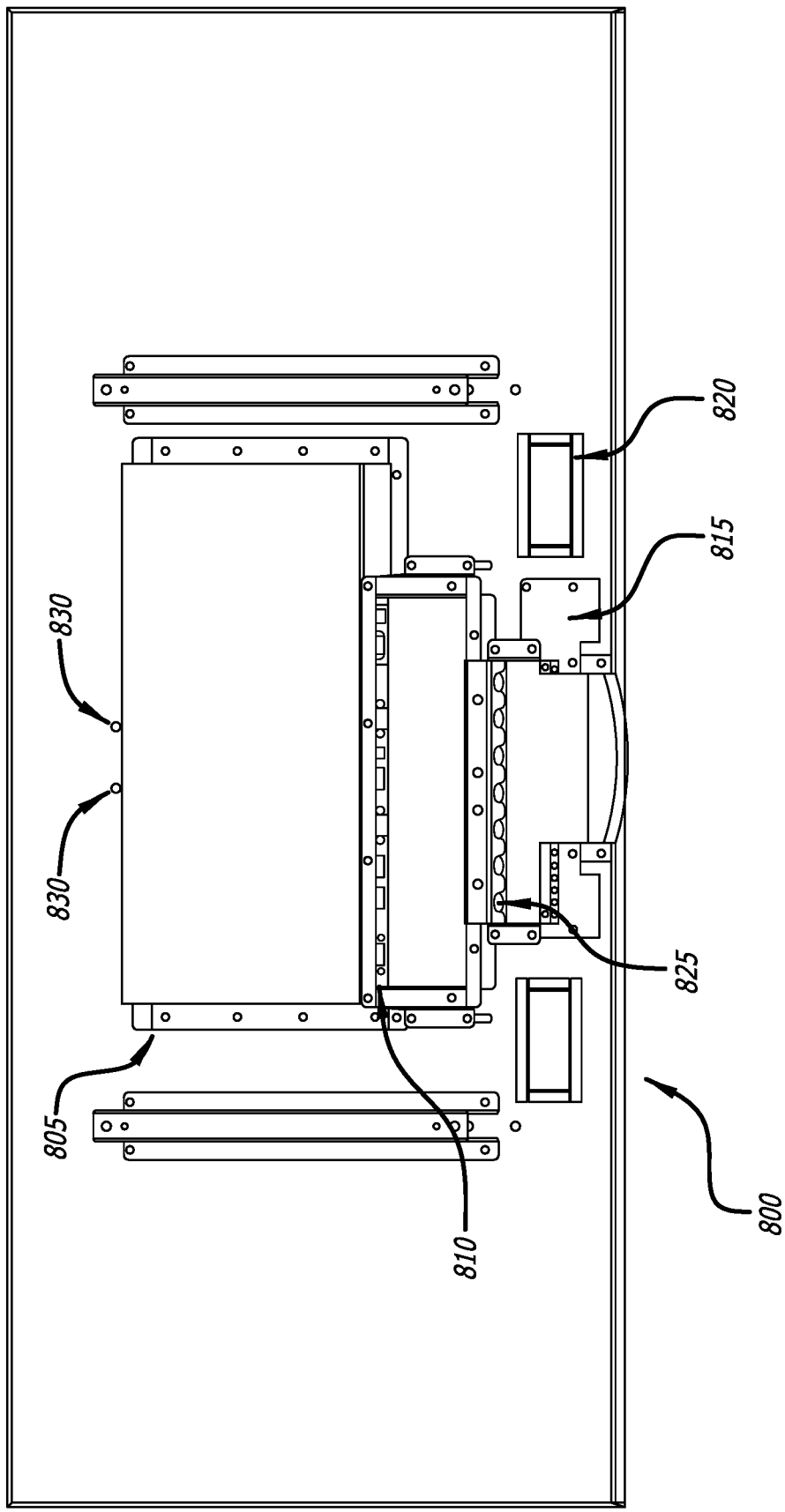
FIG. 8 illustrates the use of gasketing such as closed cell foam, or molded silicone, applied in between the two substrate surfaces where potential ingress must be restricted to protect sensitive electronics from dust and moisture according to one exemplary embodiment.

FIG. 8 depicts the placement of gaskets 800 on a rear view of an OLED display according to one exemplary embodiment with the back cover removed for visibility. There are many potential ingresses for contaminants, for example, around electronics box 805, between electronics box and cable cavity 810, around infrared sensor casing 815, around speaker housings 820, under any external lids 825, or under outer cover at any holes 830 into the OLED assembly. Gaskets are applied to any potential ingresses to protect the sensitive electronics within from dust and moisture.

Figure 9B:
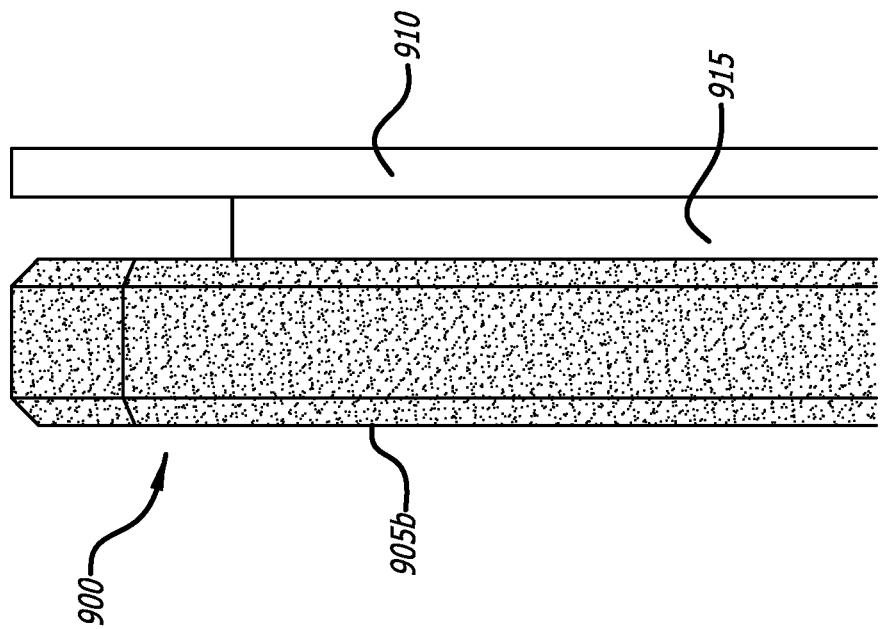
FIGS. 9A-9B illustrate an OLED display assembly incorporating the proposed controllable UV light blocking medium such as electrochromic (EC) glass, Suspended Particle Device Film (SPD), Polymer Dispersed Liquid Crystal (PDLC) or any other equivalent controllable tinting technology coupled to the front side of the OLED panel to protect the display from ultraviolet (UV) rays according to one exemplary embodiment.
Figure 9A:
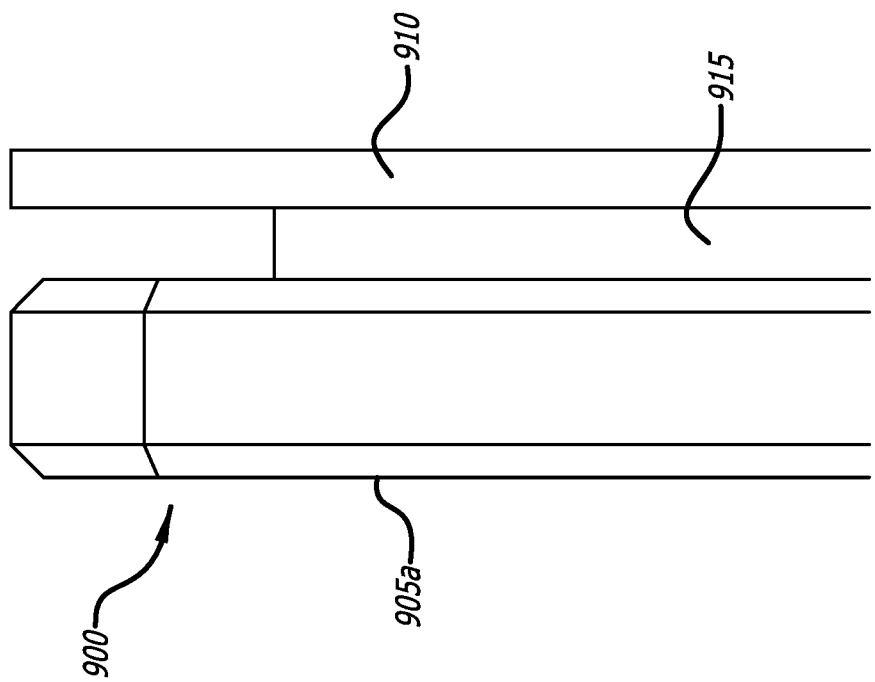

FIGS. 9A and 9B illustrate an embodiment where a controllable UV light blocking medium such as electrochromic (EC) glass, Suspended Particle Device Film (SPD), Polymer Dispersed Liquid Crystal (PDLC) or any other equivalent controllable tinting technology is optically bonded to the front side of the OLED panel to provide protection from the sun's UV light. according to one exemplary embodiment. As shown in FIG. 9A, the front of the OLED assembly 900 includes a controllable UV light blocking medium 905a in its untinted state attached to the OLED panel 910 via an optical bond layer 915. Optical bond layer 915 permanently mates the OLED panel 910 to the cover glass, providing impact, dust and water protection. FIG. 9B illustrates the tinted state of the EC glass while the OLED display assembly 900 is in standby mode (not in use). The tinted UV light blocking medium 905b acts a UV barrier that blocks up to 99% of UV light emitted by the sun or any other source, however, this also reduces the transmissivity of light from the display, thus significantly reducing the overall brightness of the device while the UV blocking medium remains in its tinted state. Therefore, the UV light blocking medium tinting is suggested for when the outdoor display is not in operational use. Reducing exposure to UV light helps prolong the life of the OLED display 910.

The incorporation of a controllable UV light blocking medium—such as electrochromic (EC) glass, Suspended Particle Device Film (SPD), Polymer Dispersed Liquid Crystal (PDLC) or any other equivalent controllable tinting technology (as illustrated in FIGS. 9A-9B)—allows the front cover glass transmissivity to be regulated in a controlled manner. In general, when content needs to be visible on the OLED panel, the controllable UV light blocking medium can be disabled or un-tinted. When the TOLED display is turned off the controllable UV light blocking medium can be tinted to block most of the direct and ambient sunlight, thus protecting the OLED display. Furthermore, certain controllable mediums such as Electrochromic (EC) coated glass or suspended particle device films (SPD) can be partially tinted to closely match the environment lighting conditions. The UV light blocking medium of choice can be controlled with ambient light sensors, timers or even manually overridden as needed. The OLED and the UV light blocking medium are mechanically coupled together, however, their functionality is independent of each other, i.e., one can be in an ON state while the other remains in an OFF state and vice versa.

EC Glass

In one embodiment, by incorporating or integrating the EC glass into the OLED assembly (shown as element 900 in FIG. 9A), the transmissivity can be controlled to reduce direct light to the OLED panel. EC glass can generally block up to 99% of ultraviolet (UV) light which would help to extend the life of the OLED panel when installed outdoors and under constant exposure to direct sunlight.

EC glass generally requires a low voltage (<3.3 v) electric current applied through it to start the tinting process. By regulating the voltage of the electric current, different tinting levels of the EC glass can be achieved. When no electric current is applied, the tinting on the EC glass disappears. Typical EC glass has a transmittance range of 60% (not tinted) to 2% (fully tinted).

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. While various embodiments of the invention have been described, it will be apparent to those of ordinary skill in the art that many more embodiments and implementations are possible within the scope of this invention. Moreover, various features and functionalities described in this application and Figures may be combined individually and/or plurality of features and functionalities with others. Accordingly, the invention is not to be restricted except in light of the attached claims and their equivalents. the known and customary practice within the art to which the invention pertains.

The invention claimed is:

1. A system for construction of an organic lighting diode (OLED) display for outside use, comprising:
    an OLED display that includes an OLED panel with a front side and a back side, a cover glass, and a back cover coupled to the back side of the OLED panel to provide structure and protection to the OLED panel against the elements; and
    an electronics box to house electronic components that power and control the OLED display,
    a cable cavity coupled to the electronics box to house and route cables, the cable cavity has a cavity lid and a cavity bottom,
    the cable cavity includes a top housing portion to receive a top foam gasket, the top housing portion has cut-out portions where cables are routed, and a bottom housing portion to receive a bottom foam gasket, the bottom housing portion has cut-out portions where cables are routed, and
    when the top housing portion is secured to the bottom housing portion, the top foam gasket and the bottom foam gasket are compressed and clamp around the cables to provide protection from moisture and dust.

2. The system of claim 1, wherein the electronics box protects the electronic components from dust and moisture.

3. The system of claim 1, wherein each of the top foam gasket and the bottom foam gasket is a compressible foam gasket strip.

4. The system of claim 1, wherein the cable cavity includes a gasket between the cavity lid and the cavity bottom to provide protection.

5. The system of claim 1, wherein an outer cover is placed over the electronics box and the cable cavity to act as a second layer to provide protection from solar loading, dust, and mild splashing.

6. The system of claim 5, wherein the outer cover includes ventilation holes to allow air to flow through.

7. The system of claim 1, further comprises:
    a controllable ultraviolet (UV) light blocking medium coupled to the front side of the OLED panel.

8. The system of claim 1, wherein the controllable UV light blocking medium reduces exposure to UV light to prolong the life of the OLED display.

9. The system of claim 1, wherein the controllable UV light blocking medium is electrochromic (EC) glass.

10. The system of claim 1, wherein the controllable UV light blocking medium is Suspended Particle Device Film (SPD).

11. The system of claim 1, wherein the controllable UV light blocking medium is Polymer Dispersed Liquid Crystal (PDLC).

12. The system of claim 1, wherein an optical bond layer is used to mate the OLED panel and the cover glass to provide impact, dust, and/or water protection.

* * * * *